United States Patent
Takahashi et al.

(10) Patent No.: US 9,203,126 B2
(45) Date of Patent: Dec. 1, 2015

(54) METHOD FOR RECOVERING VALUABLE METALS

(71) Applicant: SUMITOMO METAL MINING CO., LTD., Tokyo (JP)

(72) Inventors: Jun-Ichi Takahashi, Niihama (JP); Kazuhiro Mori, Niihama (JP)

(73) Assignee: Sumitomo Metal Mining Co., Ltd., Tokyo (JP)

(*) Notice: Subject to any disclaimer, the term of this patent is extended or adjusted under 35 U.S.C. 154(b) by 0 days.

(21) Appl. No.: 14/457,808

(22) Filed: Aug. 12, 2014

(65) Prior Publication Data

US 2014/0345422 A1 Nov. 27, 2014

Related U.S. Application Data

(63) Continuation of application No. 14/110,672, filed as application No. PCT/JP2012/053492 on Feb. 15, 2012.

(30) Foreign Application Priority Data

Apr. 15, 2011 (JP) ................................. 2011-090724

(51) Int. Cl.
*C21B 3/02* (2006.01)
*C21B 11/10* (2006.01)
(Continued)

(52) U.S. Cl.
CPC .................. *H01M 10/54* (2013.01); *C21B 3/02* (2013.01); *C21B 11/10* (2013.01); *C22B 1/02* (2013.01);
(Continued)

(58) Field of Classification Search
CPC .......... C21B 3/02; C21B 11/10; C22B 7/001; C22B 15/0056; C22B 15/0039; C22B 23/023; C22B 23/02; H01M 10/54
See application file for complete search history.

(56) References Cited

U.S. PATENT DOCUMENTS 5,467,365 A * 11/1995 Bied-Charreton et al. ....... 373/9
6,009,817 A    1/2000 Hanulik
(Continued)

FOREIGN PATENT DOCUMENTS

CA    2041307 A1 * 10/1991 ................ C22B 7/00
DE    102008012183 A1 * 9/2009 ................ C22B 7/00
(Continued)

OTHER PUBLICATIONS

DE 102008012183. Machine translation. published Sep. 2009.*
(Continued)

*Primary Examiner* — George Wyszomierski
*Assistant Examiner* — Tima M McGuthry Banks
(74) *Attorney, Agent, or Firm* — Locke Lord LLP; Jeffrey D. Hsi

(57) ABSTRACT

Provided is a method in which, when discarded batteries such as lithium-ion batteries are treated by a dry process, slag having a reduced viscosity is obtained to heighten the recovery of valuable metals. The method for recovering valuable metals includes a dry process (S20) which includes a melting step (ST21), a slag separation step (ST22), and an alloy separation step (ST23), the slag having an aluminum oxide content of 5 mass % or higher but less than 20 mass % and an iron content in terms of metallic iron amount of 20-40 mass %. Furthermore, silicon oxide and calcium oxide are added as a flux in the melting step (ST21) so that the slag has a melting point of 1,400° C. or lower, and the melting step (ST21) is conducted at 1,400° C. or lower. Thus the recovery of the alloys can be heightened.

11 Claims, 2 Drawing Sheets

(51) Int. Cl.
  *C22B 7/00* (2006.01)
  *C22B 15/00* (2006.01)
  *C22B 23/02* (2006.01)
  *H01M 10/54* (2006.01)
  *C22B 1/02* (2006.01)
  *C22B 21/00* (2006.01)

(52) U.S. Cl.
  CPC .............. *C22B 7/001* (2013.01); *C22B 7/006* (2013.01); *C22B 15/0039* (2013.01); *C22B 15/0056* (2013.01); *C22B 21/0084* (2013.01); *C22B 23/02* (2013.01); *C22B 23/023* (2013.01); *Y02W 30/54* (2015.05); *Y02W 30/84* (2015.05)

(56) References Cited

U.S. PATENT DOCUMENTS

| | | |
|---|---|---|
| 7,169,206 B2 | 1/2007 | Cheret et al. |
| 2001/0054331 A1 | 12/2001 | Yasuda et al. |
| 2002/0194960 A1 | 12/2002 | Yasuda et al. |
| 2011/0308353 A1 | 12/2011 | Hendrickson et al. |
| 2012/0240729 A1* | 9/2012 | Verscheure et al. ............ 75/626 |

FOREIGN PATENT DOCUMENTS

| | | | |
|---|---|---|---|
| EP | 1589121 | A1 | 10/2005 |
| JP | 9-291317 | A | 11/1997 |
| JP | 9-316678 | A | 12/1997 |
| JP | 10-158751 | A | 6/1998 |
| JP | 2002-339023 | A | 11/2002 |
| JP | 2009011968 | A * | 1/2009 |
| JP | 2012-057238 | A | 3/2012 |

OTHER PUBLICATIONS

JP 2009011968 A. Machine translation. Published Jan. 2009.*
International Search Report of PCT/JP2012/053492 dated May 1, 2012.
Extended European Search Report issued to EP Appln. No. 12771039.0, mailed Apr. 3, 2014.
Notice of Reasons for Rejection issued to CN Appln. No. 201280017952.3, mailed Apr. 28, 2014.

* cited by examiner

METHOD FOR RECOVERING VALUABLE METALS

CROSS-REFERENCE TO RELATED APPLICATIONS

This application is a Continuation Application of U.S. application Ser. No. 14/110,672 abandoned, filed Nov. 22, 2013, which is a national phase under 35 U.S.C. §371 of PCT International Application No. PCT/JP2012/053492, filed Feb. 15, 2012, which claims the benefit of Japanese Patent Application No. 2011-090724, filed Apr. 15, 2011, the entire contents of the aforementioned applications are hereby incorporated herein by reference.

TECHNICAL FIELD

The invention relates to a method for efficiently recovering valuable metals from waste batteries, such as lithium-ion batteries.

BACKGROUND ART

Processes for recycling used or in-process defective batteries (hereinafter referred to as "waste batteries"), such as waste lithium-ion batteries, and recovering their valuable metals are broadly divided into dry and wet processes.

A dry process includes melting crushed waste batteries, separating valuable metals, which are to be recovered, from other less valuable metals and materials by harnessing the difference in oxygen affinity between them, and recovering the valuable metals. Specifically, such a dry process includes oxidizing less valuable elements, such as iron, as much as possible to form slag and suppressing the oxidation of valuable materials, such as cobalt, as much as possible to recover the valuable materials in the form of an alloy.

For example, Patent Document 1 discloses that valuable metals such as a nickel and cobalt are recovered in the form of an alloy by using a high-temperature heating furnace and adding a $SiO_2$/CaO-based flux to waste batteries, and at this time, the slag has a composition containing 20% or more of iron in terms of metallic iron, and 20% or less each of nickel and cobalt, with the $SiO_2$/CaO ratio being 1 or greater. The melting temperature in the Examples is 1450 C.

[Patent Document 1] U.S. Pat. No. 7,169,206

DISCLOSURE OF THE INVENTION

Problems to be Solved by the Invention

Aluminum foil is used in the cathode of waste batteries such as lithium ion batteries. Since aluminum metal has a property of being highly susceptible to oxidation, when aluminum metal is subjected to a melting treatment, alumina ($Al_2O_3$), which is an oxide thereof, is produced. This alumina is distributed in the slag, but it is known that alumina simultaneously increases the melting point of the slag and increases the slag viscosity. In this case, there is a problem that when the melting point is low, the slag may not melt, the viscosity increases, separation from the alloy that includes valuable metals to be recovered is inefficient, and the recovery rate is decreased. On the other hand, from the viewpoint of operation efficiency, it is preferable that the melting temperature be as low as possible.

As such, in a slag separation process and an alloy separation process based on a dry method, it is desired to carry out the separation by controlling the melting point of the slag to be on the lower temperature side. However, in regard to a multi-component system in which various kinds of oxides of iron and aluminum are incorporated into the slag as in the case of waste batteries, no investigations have been conducted on preferred slag components and the melting point of the slag. Particularly, the matter of paying attention to the amount of alumina or iron and thereby determining the melting temperature is not disclosed in Patent Document 1.

The present invention was elaborated in order to solve the problems described above, and an object of the invention is to provide a method which enables operation at a low temperature by reducing the slag viscosity when waste batteries such as lithium ion batteries are treated by a dry method, and also enables efficient recovery of valuable metals by performing the separation of the slag and the alloy reliably.

Means for Solving the Problems

The inventors of the present invention found that, with regard to a slag composition containing a predetermined amount of alumina, the melting temperature of the slag as a whole can be further decreased by adding a $SiO_2$/CaO based flux, as well as causing an oxide of iron to coexist, thus completing the present invention. More specifically, the present invention provides the following.

(1) A method for recovering valuable metals from waste batteries containing aluminum and iron, the method including a melting step of melting the waste batteries and thereby obtaining a melt; a slag separation step of separating the slag from the melt; and an alloy separation step of separating an alloy of valuable metals from the melt, wherein in the melting step silicon dioxide and calcium oxide are added as a flux, the content of aluminum oxide in the slag is more than or equal to 5% by mass and less than 20% by mass, the content of iron in terms of metallic iron is from 20% by mass to 40% by mass, and the melting step is carried out at a temperature lower than or equal to 1400° C.

(2) The method for recovering valuable metals according to item (1), wherein in the melting step, iron is externally added to the melt, and thereby the iron content in the slag is adjusted to from 20% by mass to 40% by mass.

(3) The method for recovering valuable metals according to item (1) or (2), wherein the mass ratio of silicon dioxide/calcium oxide in the slag is in the range of from 0.5 to 2.

(4) The method for recovering valuable metals according to any one of items (1) to (3), wherein the melting step is carried out in an electric furnace.

(5) The method for recovering valuable metals according to any one of items (1) to (4), wherein the waste batteries are lithium ion batteries.

Effects of the Invention

According to the present invention, when waste batteries such as lithium ion batteries are treated in a dry state, operation at a low temperature is enabled by reducing the slag viscosity, and also separation of the slag and an alloy is reliably carried out so that valuable metals can be efficiently recovered.

EXPLANATION OF REFERENCE NUMERALS

ST10 Waste battery pretreatment step
S20 Dry step
ST21 Melting step
ST22 Slag separation
ST23 Alloy separation
ST24 Exhaust gas treatment
ST25 Phosphorus removal step
ST26 Alloy shot-forming step
S30 Wet step
ST31 Dissolution step
ST32 Element separation step

PREFERRED MODE FOR CARRYING OUT THE INVENTION

Figure 1:
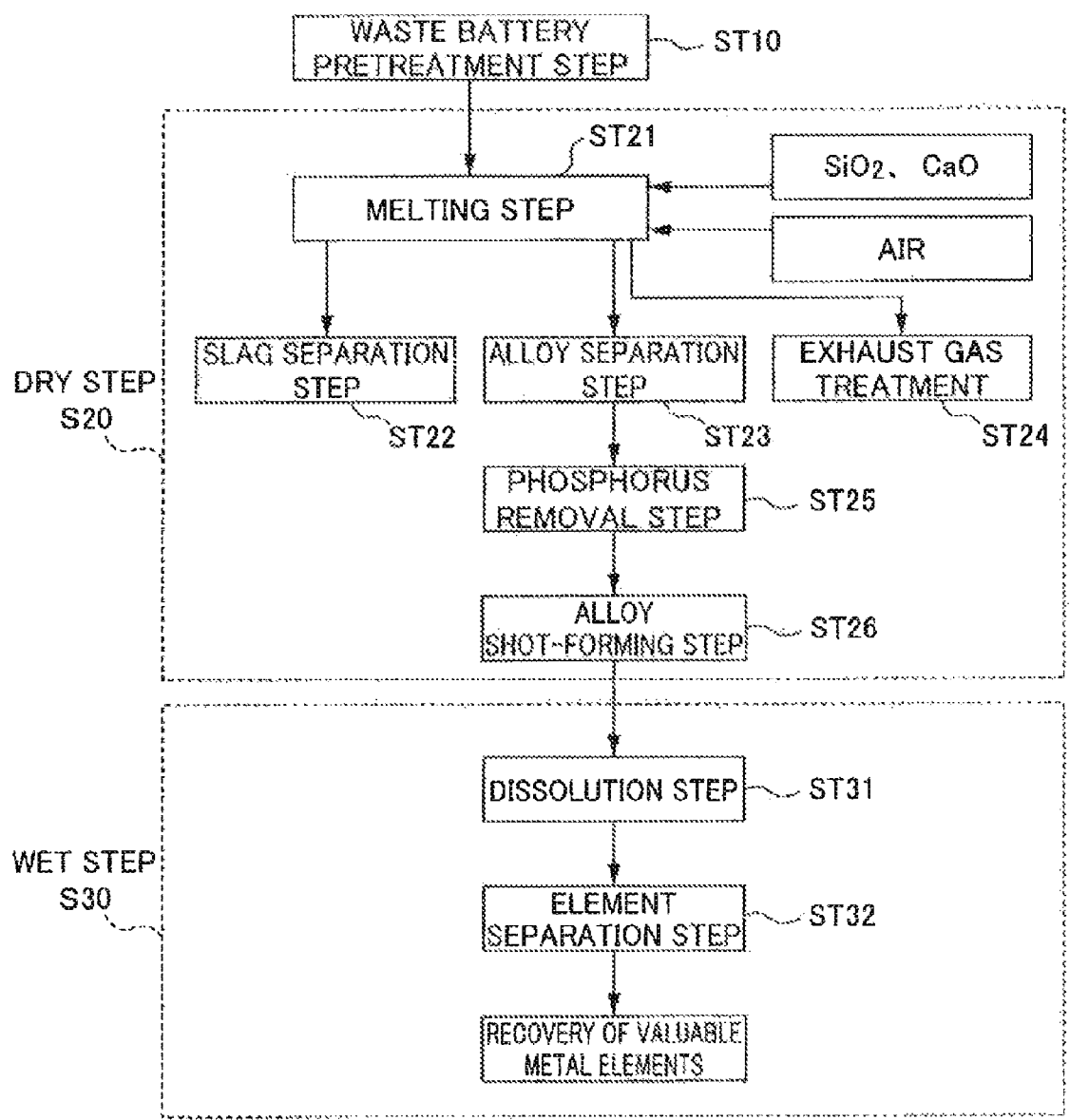
FIG. 1 is a flow chart showing an example of the invention, specifically, a method for recovering valuable metals from waste batteries.

Hereinafter, an embodiment of the present invention will be described with reference to the drawings. FIG. 1 is a flowchart illustrating an example of the method for recovering valuable metals from waste batteries. First, the overall process of the method for producing valuable metals will be explained, and then the slag composition as a feature of the present invention, and means for obtaining the slag composition are presented. Meanwhile, in this present embodiment, the case where the waste batteries are lithium ion batteries will be described; however, it is acceptable for the present invention as long as the waste batteries are waste batteries containing aluminum and iron, and the present invention is not intended to be limited thereto.
Whole Process As shown in FIG. 1, this valuable metal recovery method includes a waste battery pretreatment step ST10, a dry step S20, and a wet step S30. Thus, the valuable metal recovery method according to this embodiment is a total process including obtaining an alloy in the dry step S20 and then separating and recovering valuable metal elements using the wet step S30. As used herein, the term "waste battery" is intended to include not only a used battery but also others such as in-process defect batteries. We also do not intend to exclude adding metal, resin, or any other material apart from waste batteries, as needed, as long as the object to be processed contains a waste battery. In such a case, metal, resin, or any other material is encompassed by the term "waste battery" in the invention.
Waste Battery Pretreatment Step ST10

The waste battery pretreatment step ST10 is performed to prevent waste batteries from exploding. Waste batteries are closed systems and contain an electrolytic solution or the like inside them. Thus, subjecting them to a dry melting process as they are involves a risk of explosion and is dangerous. Therefore, gas-venting holes need to be formed in some way.

The waste battery pretreatment step ST10 may be performed using any specific method. For example, holes may be mechanically formed in waste batteries using a needle-shaped cutting edge. In the invention, it is not necessary to separate or process individual parts because a melting step is performed in the later dry process.
Dry Step 20

The dry step S20 includes performing a melting step ST21 including melting the pre-treated waste batteries, which are obtained in the waste battery pretreatment step ST10, at a predetermined temperature to form a melt. The melting step ST21 can be performed in a conventionally known electric furnace or the like.

In this step, an oxidizing agent such as air is blown in to control the degree of oxidation and to increase the recovery of nickel, cobalt, and copper. For example, foliated aluminium is used in the cathode materials of lithium-ion batteries. Carbon is also used in the anode materials of lithium-ion batteries. Batteries also have outer shells made of iron or aluminium, and plastics are used in the outer packages of battery pack. These materials are basically reducing agents and thus oxidized when melted, so that the total reaction to produce gas and slag will be an oxidation reaction. Therefore, it is necessary to introduce oxygen into the system. Because of this, air is introduced in the melting step ST21.

Although the oxidizing agent is not restricted, pure oxygen, oxygen-rich gas, air, or any other oxygen-containing gas is preferably used because it is easy to handle. In the melting step ST21, the gas is directly supplied into the electric furnace. Dust, exhaust gas, and other exhaust products in the melting step ST21 are processed to be harmless in a conventionally known exhaust gas treatment ST24.

Additionally, in the melting step ST21, $SiO_2$ and CaO or other materials are added as fluxes to lower the melting point of the slag to be separated in the slag separation ST22 described below. This is a feature of the invention and will be described in detail below.

The melting step ST21 produces an alloy of valuable metals, such as nickel, cobalt, and copper, and also produces slag, which is an oxide of iron, aluminium, and the like. Both products, which have different specific gravities, are recovered in slag separation ST22 and alloy separation ST23, respectively.

After alloy separation ST23 is performed, the resulting alloy is further subjected to a dephosphorylation step ST25. In lithium-ion batteries, ethylene carbonate, diethyl carbonate, or other organic solvents are used, and $LiPF_6$ (lithium hexafluorophosphate) or other electrolytes are used. The phosphorus in $LiPF_6$ tends to be relatively easily oxidized, but also tends to have a relatively high affinity for iron group elements such as iron, cobalt, and nickel. Phosphorus in the alloy is difficult to remove by the wet step, which is a later step for recovering each element in the form of metal from the alloy obtained in the dry process, and phosphorus is also accumulated as an impurity in the treatment system, which makes it difficult to continue the process. Thus, phosphorus is removed in the dephosphorylation step ST25.

More specifically, lime or other materials capable of reacting to produce CaO are added, and oxygen-containing gas such as air is blown in so that phosphorus in the alloy can be oxidized and absorbed into the CaO.

When the waste batteries are lithium-ion batteries, the alloy obtained in this manner contains, as main components, cobalt or nickel derived from the cathode materials, lithium derived from electrolytes, and copper derived from the anode materials, etc.
Alloy Shot-Forming Step S26

In this embodiment, the alloy is cooled and obtained in the form of grains (also referred to as "shot-shaped alloy" or simply "shots") at the end of the dry step S20. This makes it possible to perform a dissolution step ST31 in a short period of time in the later wet step S30.

As described below, when the dry step is performed as a pretreatment in a wide sense, an alloy with fewer impurities can be obtained, and the amount of the material to be introduced into and treated in the wet step can be significantly reduced, so that a combination of the dry step and the wet step can work effectively. However, the wet step is a complicated process and basically unsuitable for high-throughput procedures. Thus, to use the wet step in combination with the dry step, the processing time of the wet step needs to be short, and in particular, the dissolution step ST31 needs to be performed in a short period of time. This problem can be solved by forming the alloy into grains so that the dissolution time can be reduced.

In this step, the grain preferably has an average surface area in the range of 1 mm² to 300 mm² and an average weight in the range of 0.4 mg to 2.2 g. If the surface area or the weight is less than the lower limit of the range, a problem may occur in which the particles are too small and thus difficult to handle and a reaction occurs too rapidly so that it will be difficult to dissolve the particles at a time due to too much heat generation, which is not preferred. If the surface area or the weight is more than the upper limit of the range, the rate of dissolution in the later wet step can undesirably decrease. The alloy can be made in the form of shots or formed into grains using a conventionally known method of pouring the molten metal into running water to rapidly cool it.

Wet Step S30

In a process of recovering valuable metals from waste batteries, the alloy recovered as described in Patent Document 1 is not valuable, and thus valuable metal elements must be recovered. When waste batteries are pretreated by the dry step so that an alloy of only valuable metals is obtained as described above, the later wet step can be simplified. In this case, the throughput of the wet step can be reduced to about 1/4 to 1/3 (weight ratio) of the amount of the input waste batteries. This also makes the use of the wet step in combination advantageous.

Using the dry step as a pretreatment in a wide sense as described above makes it possible to obtain an alloy with fewer impurities and to significantly reduce the throughput. Thus, the invention makes possible a combination of the dry step and the wet step on an industrial scale.

The wet step is not restricted and may be performed using a conventionally known method. An example of the wet step is as follows. When the waste batteries are lithium-ion batteries and specifically when an alloy of cobalt, nickel, copper, and iron is produced, the alloy is subjected to dissolution with acid (the dissolution step ST31), and then an element separation step ST32 is performed, in which deionization, separation and recovery of copper, nickel/cobalt separation, recovery of nickel, and recovery of cobalt are conducted in this order, so that valuable metal elements are successfully recovered.

Throughput

In a conventional total process including a combination of a dry step and a wet step, oxidation in the dry step is performed when waste batteries are in a molten state. To control the degree of oxidation properly in the oxidation process, the melting step in the dry step of the conventional process must be a batch process, so that a new step must be performed from the beginning after the oxidation of all waste batteries, which are processed at the same time in a melting furnace, is completed. The valuable metal recovery method of the invention enables a higher throughput than conventional techniques because in the method of the invention, waste batteries having previously undergone oxidation in the pre-oxidation step can be continuously introduced into the melting furnace so that they can be continuously processed in the dry step. The invention is suitable for use in cases where the throughput is at least 1 t per day, preferably at least 10 t per day.

The waste batteries may be of any type. Preferred examples of the object to be processed according the invention are lithium-ion batteries, from which rare metals such as cobalt and nickel can be recovered, and whose applications expand to include automobile batteries and others, so that large-scale recovery processes will be necessary for them.

[Formation in the Melting Step ST21]

Next, the formation of slag, which is a feature of the invention, in the melting step ST21 will be described. When waste batteries containing aluminium, lithium, iron, and manganese are processed, manganese becomes a main component of the slag in the process of melting the pretreated waste batteries placed in the furnace.

The oxidation of the main elements constituting the melt depends on the difference in affinity for oxygen, which generally follows the order: aluminium>lithium>carbon>manganese>phosphorus>iron>cobalt>nickel>copper. In other words, aluminium is the most vulnerable to oxidation, while copper is the most resistant to oxidation. Therefore, if the slag contains aluminium vulnerable to oxidation, aluminium oxide (alumina) will be formed as high-melting-point and high-viscosity slag.

It is empirically known that a slag containing a large amount of aluminum oxide turns into a slag having a high melting temperature and high viscosity. An increase in the melting point of the slag is not preferable because the operation cost greatly increases as a result of the increase in the energy cost, the increase in the rate of melting-induced damage, or the like. Particularly, when the melting temperature is higher than 1500° C., operation using a conventional electric furnace becomes difficult, and it is necessary to use the plasma treatment and the like described in Patent Document 1 in combination. Accordingly, even from the viewpoint of carrying out the melting step ST21 in a conventionally known electric furnace, the melting temperature of the slag is 1400° C. or lower, and preferably 1300° C. or lower. When the melting temperature is in this range, since the melting step ST21 can be carried out at a temperature of 1400° C. or lower, and preferably 13000° C. or lower, conventionally known electric furnaces can be used and high usability and high productivity are achieved. Also, since separation between the alloy and the slag is sufficiently carried out, the recovery ratio of valuable metals contained in the alloy is also increased.

In the invention, the melting step ST21 includes adding SiO₂ and CaO to lower the melting point of the slag (see FIG. 1). This enables the slag to have a lower melting point and thus to have lower viscosity. SiO₂ (silicon dioxide) and CaO (lime) are added. The ratio of the addition of them is preferably such that the weight ratio of silicon dioxide to calcium oxide in the slag is in the range of 0.5 to 2, more preferably in the range of 0.8 to 1.4. If the weight ratio is less than 0.5, the slag may have an undesirably high melting point. If the weight ratio is more than 2, the viscosity of the slag may be so high as to make it difficult to separate the alloy from the slag, which is not preferred.

In the present invention, the amounts of alumina and iron in the slag are also important. Specifically, the content of alumina in the slag is more than or equal to 5% by mass and less than 20% by mass, and the content of iron in terms of metallic iron is from 20% by mass to 40% by mass. As iron is incorporated into the slag, not only the amount of alumina is relatively decreased, but also iron ions work as cations, thereby cutting the network in the slag constructed by alumina. Therefore, iron ions assist in fluidization of the slag, and lower the melting point of the slag. As a result, the performance of separation from the alloy is increased, and thereby the recovery ratio of valuable metals can be increased. As such, the novelty of the present invention lies in that a low viscosity slag composition range that can be practically utilized in real operation has been found by considering the addition of a flux as well as the amount of aluminum or iron assumed to be used in the treatment of waste batteries, and by examining a comprehensive decrease in the melting point of the slag.

Meanwhile, when the amount of iron contained in the waste batteries is small, and the iron content in the slag as described above is less than 20% by mass, the method for recovering valuable metals according to the present invention can be carried out by externally adding a separate iron source other than the iron contained in the waste batteries to the melt of waste batteries, and thereby increasing the iron content in the slag. For example, in the real operation, the method for recovering valuable metals of the present invention can be suitably carried out by using a material having a higher content ratio of iron oxide than the content ratio of alumina, such as scrap iron or various smelting slags, as an iron source, adding the material to the melt of waste batteries in the melting step, and when the added material is metallic iron, subjecting the added material to oxidation to the extent corresponding thereto so as to convert the material into slag.

Furthermore, when the content of alumina is 5% by mass or less, the problem that the slag acquires a high melting temperature does not easily occur. When the content of alumina is more than 20% by mass, even if the flux or iron content is adjusted, it is difficult to adjust the melting point of the slag to 1400° C. or lower. On the other hand, when the content of iron in terms of metallic iron is less than 20% by mass, the decrease in the melting point of the slag is insufficient, and it is difficult to adjust the melting point of the slag to 1400° C. or lower. When the content of iron is more than 40% by mass, the amount of the iron source that needs to be supplied in addition to waste batteries becomes large, and it is not preferable in view of cost.

As such, the slag obtainable in the slag separation step ST22 has a melting point of 1400° C. or lower, and preferably a melting point of 1300° C. or lower. Furthermore, as the melting step ST21 is carried out at a temperature of 1400° C. or lower, and preferably 1300° C. or lower, the viscosity of the slag is sufficiently decreased, and therefore, separation of the alloy is made easier. Thus, the recovery ratio in the alloy separation step ST23 is increased.

EXAMPLE

Hereinafter, the invention will be more specifically described with reference to the Examples and Comparative Example below, which however are not intended to limit the invention.

First, Examples will be described. In the Examples, in an alumina crucible installed in an electric furnace in a nitrogen atmosphere, 7.3 g of a mixed flux having a $SiO_2/CaO$ ratio indicated in Table 1 was added to about 23 g of waste lithium ion batteries (hereinafter, also called a sample), and furthermore, a predetermined amount of iron was added thereto separately from the iron contained in the waste lithium ion batteries. Those mixtures were retained at the treatment temperatures indicated in Table 1 for 30 minutes. Meanwhile, with regard to the addition amount of iron, the amounts at which the concentrations of oxidized iron in the slag would be equivalent to the proportion of the respective Examples were estimated, and the amounts were respectively designated as predetermined amounts. After the retention, the samples were oxidized by blowing a predetermined amount of oxygen through an alumina tube. After oxidation, the sample was retained for 30 minutes and then was cooled in the furnace, and after cooling, the slag and the alloy were separately collected. Thus, the distribution ratios of metallic iron and metallic cobalt in the alloy, and the concentrations of metallic iron and alumina in the slag were respectively analyzed by an ICP method.

Next, Comparative Example will be described. In Comparative Example, in the same alumina crucible as that used in the Examples, a mixed flux having the $SiO_2/CaO$ ratio indicated in Table 1 was added in the same amount as that used in Examples, to waste lithium batteries in the same amount as that used in Examples, and without performing the addition of iron that was carried out in Examples, the mixture was retained at the treatment temperature indicated in Table 1 for 30 minutes. After the retention, the sample was subjected to oxidation, furnace cooling, and separate collection of the slag and the alloy by the same treatments as those used in Examples, and the distribution ratio of metallic iron and metallic cobalt in the alloy, and the concentrations of metallic iron and alumina in the slag were respectively analyzed by an ICP method.

The results of determining the distribution ratio of metallic iron and metallic cobalt in the alloy and the concentrations of metallic iron and alumina in the slag from the mass of the alloy and the slag and the analytical values for iron and cobalt are presented in Table 1. Furthermore, the distribution ratios of metallic iron and metallic cobalt in the alloys are presented in FIG. 2.

TABLE 1

| Name of element | | Example 1 | Example 2 | Example 3 | Example 4 | Example 5 | Comparative Example |
|---|---|---|---|---|---|---|---|
| Distribution ratio in metal | Fe | 36% | 48% | 59% | 91% | 93% | 37% |
| | Co | 81% | 94% | 91% | 98% | 98% | 46% |
| Concentration in slag | Fe (wt %) | 39.2 | 38.9 | 37.7 | 35.2 | 25.2 | 16.8 |
| | $Al_2O_3$ (wt %) | 19.7 | 16.2 | 19.8 | 18.6 | 16.6 | 36.3 |
| | $SiO_2/CaO$ ratio | 1.0 | 1.0 | 1.0 | 2.0 | 0.5 | 1.0 |
| | Treatment temperature | 1400 | 1400 | 1300 | 1400 | 1400 | 1400 |

Figure 2:
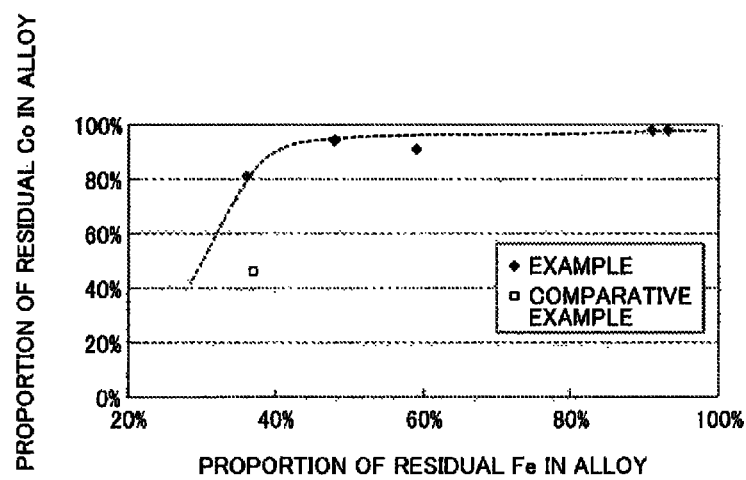
FIG. 2 is a graph showing the distribution ratios of metallic iron and metallic cobalt in an alloy in Example and Comparative Example.

As can be seen from Table 1 and FIG. 2, it is understood that when the amounts of aluminum oxide and iron in the slag are adjusted to the range of the present invention, and the mass ratio of silicon dioxide/calcium oxide in the flux to be added is adjusted to the range of from 0.5 to 2, the slag viscosity is decreased, the alloy and the slag are satisfactorily separated, and the alloy and the slag can be separately collected at a melting temperature of 1300° C. or 1400° C. Furthermore, as illustrated in FIG. 2, it is understood that according to the method for recovering valuable metals of the present invention, when the distribution ratio of iron in the alloy, that is, the mass ratio of metallic iron in the alloy with respect to the total amount of iron in terms of elemental iron is adjusted to 36% or more, and when the recovery ratio of metallic cobalt is adjusted to 81% or more while the mass ratio of metallic iron is adjusted to 48% or more, a recovery ratio of metallic cobalt of 91% or more can be obtained, and that valuable metals can be recovered with a high recovery ratio.

The invention claimed is:

1. A method for recovering valuable metals from waste batteries containing aluminum and iron, the method comprising:
   a melting step of melting the waste batteries and thereby obtaining a melt;
   a slag separation step of separating slag from the melt; and
   an alloy separation step of separating an alloy of valuable metals from the melt, wherein
   in the melting step, silicon dioxide and calcium oxide are added as fluxes,
   a content of aluminum oxide in the slag is more than or equal to 5% by mass and less than 20% by mass, and a content of iron in terms of metallic iron in the slag is from 25.2% by mass to 40% by mass, and
   the melting step is carried out at a temperature of 1400° C. or lower.

2. The method for recovering valuable metals according to claim 1, wherein, in the melting step, a content of iron in the slag is adjusted from 20% by mass to 40% by mass by externally adding iron to the melt.

3. The method for recovering valuable metals according to claim 2, wherein a mass ratio of silicon dioxide/calcium oxide in the slag is in the range of from 0.5 to 2.

4. The method for recovering valuable metals according to claim 2, wherein the melting step is carried out in an electric furnace.

5. The method for recovering valuable metals according to claim 2, wherein the waste batteries are lithium ion batteries.

6. The method for recovering valuable metals according to claim 1, wherein a mass ratio of silicon dioxide/calcium oxide in the slag is in the range of from 0.5 to 2.

7. The method for recovering valuable metals according to claim 6, wherein the melting step is carried out in an electric furnace.

8. The method for recovering valuable metals according to claim 6, wherein the waste batteries are lithium ion batteries.

9. The method for recovering valuable metals according to claim 1, wherein the melting step is carried out in an electric furnace.

10. The method for recovering valuable metals according to claim 9, wherein the waste batteries are lithium ion batteries.

11. The method for recovering valuable metals according to claim 1, wherein the waste batteries are lithium ion batteries.

* * * * *